(12) United States Patent
Hsiao et al.

(10) Patent No.: US 11,397,303 B2
(45) Date of Patent: Jul. 26, 2022

(54) OPTICAL ELEMENT DRIVING MECHANISM

(71) Applicant: TDK TAIWAN CORP., Taoyuan (TW)

(72) Inventors: Yi-Cheng Hsiao, Taoyuan (TW); Chao-Chang Hu, Taoyuan (TW); Che-Wei Chang, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 286 days.

(21) Appl. No.: 16/744,737

(22) Filed: Jan. 16, 2020

(65) Prior Publication Data

US 2020/0310070 A1 Oct. 1, 2020

Related U.S. Application Data

(60) Provisional application No. 62/825,538, filed on Mar. 28, 2019.

(30) Foreign Application Priority Data

Dec. 20, 2019 (EP) .................................... 19218902

(51) Int. Cl.
*G02B 7/02* (2021.01)
*G02B 27/64* (2006.01)
*G02B 7/28* (2021.01)

(52) U.S. Cl.
CPC ............... *G02B 7/02* (2013.01); *G02B 7/282* (2013.01); *G02B 27/64* (2013.01)

(58) Field of Classification Search
CPC .......... G02B 27/64; G02B 7/02; G02B 7/282

USPC ......................................................... 359/554
See application file for complete search history.

(56) References Cited

U.S. PATENT DOCUMENTS

| 7,539,404 | B2 * | 5/2009 | Iwasaki | G02B 27/646 348/208.99 |
| 8,073,317 | B2 * | 12/2011 | Kitano | G03B 17/17 396/55 |
| 8,184,167 | B2 * | 5/2012 | Inaba | G03B 5/00 348/208.99 |
| 2007/0127907 | A1 * | 6/2007 | Iwasaki | G02B 27/646 396/144 |

(Continued)

*Primary Examiner* — William R Alexander
(74) *Attorney, Agent, or Firm* — Muncy, Geissler, Olds & Lowe, P.C.

(57) ABSTRACT

An optical element driving mechanism is provided and includes a fixed assembly, a movable assembly, a driving assembly, and a position-sensing assembly. The movable assembly corresponds to an optical element, and the movable assembly is movable relative to the fixed assembly. The driving assembly is configured to drive the movable assembly to move relative to the fixed assembly. The position-sensing assembly is configured to sense the movement of the movable assembly relative to the fixed assembly, and the position-sensing assembly includes a sensed unit and a sensing element. The sensing element corresponds to the sensed unit. The sensed unit has a plurality of reference magnetic elements arranged in a first direction, the sensed unit and the sensing element are arranged in an arrangement direction, and the first direction is not parallel to the arrangement direction.

24 Claims, 11 Drawing Sheets

(56) References Cited

U.S. PATENT DOCUMENTS

| | | | |
|---|---|---|---|
| 2007/0297781 A1* | 12/2007 | Kitano | G03B 5/06 396/55 |
| 2008/0111890 A1* | 5/2008 | Inaba | G03B 5/00 348/208.99 |
| 2016/0202445 A1* | 7/2016 | Yamamoto | G02B 7/08 359/824 |
| 2019/0025540 A1* | 1/2019 | Shin | G03B 3/12 |
| 2019/0094565 A1* | 3/2019 | Park | G03B 17/08 |
| 2019/0204616 A1* | 7/2019 | Yeo | H02K 41/0356 |
| 2020/0195815 A1* | 6/2020 | Lee | H04N 5/2253 |
| 2020/0209710 A1* | 7/2020 | Park | G02B 7/09 |
| 2020/0348532 A1* | 11/2020 | Park | G02B 7/08 |

* cited by examiner

OPTICAL ELEMENT DRIVING MECHANISM

CROSS REFERENCE TO RELATED APPLICATIONS

This application claims the benefit of U.S. Provisional Application No. 62/825,538, filed Mar. 28, 2019, and European Patent Application No. 19218902.5, filed Dec. 20, 2019, the entirety of which are incorporated by reference herein.

BACKGROUND OF THE DISCLOSURE

Field of the Disclosure

The present disclosure relates to an optical element driving mechanism, and in particular it relates to an optical element driving mechanism having a liquid lens.

Description of the Related Art

As technology has progressed, many kinds of electronic devices such as smartphones have begun to include the functionality of digital photography or video recording. A user can operate an electronic device to capture various images with a camera module that is included in the electronic device.

The design trend of today's electronic devices is toward miniaturization, meaning that the various components of a camera module or its structure must also be continuously reduced, so as to achieve the purpose of miniaturization. In addition, some camera modules adopt liquid lenses, and a driving mechanism of the camera module is used to change the shape of the liquid lens to achieve the function of optical zoom, so as to take the required photos or videos. However, although the existing driving mechanism can achieve the aforementioned functions of photographing or video recording, they still cannot meet all the needs of miniaturization.

Therefore, how to design a camera module that can perform autofocus or optical image stabilization, and miniaturization at the same time is a topic nowadays that needs to be discussed and solved.

BRIEF SUMMARY OF THE DISCLOSURE

Accordingly, one objective of the present disclosure is to provide an optical element driving mechanism to solve the above problems.

According to some embodiments of the disclosure, an optical element driving mechanism is provided and includes a fixed assembly, a movable assembly, a driving assembly, and a position-sensing assembly. The movable assembly corresponds to an optical element, and the movable assembly is movable relative to the fixed assembly. The driving assembly is configured to drive the movable assembly to move relative to the fixed assembly. The position-sensing assembly is configured to sense the movement of the movable assembly relative to the fixed assembly, and the position-sensing assembly includes a sensed unit and a sensing element. The sensing element corresponds to the sensed unit. The sensed unit has a plurality of reference magnetic elements arranged in a first direction, the sensed unit and the sensing element are arranged in an arrangement direction, and the first direction is not parallel to the arrangement direction.

According to some embodiments, an arrangement direction of magnetic poles of each of the reference magnetic elements is not parallel to the first direction, and arrange sequences of the magnetic poles of the reference magnetic elements are opposite.

According to some embodiments, the driving assembly is configured to drive the movable assembly to move relative to the fixed assembly in the first direction within a range of movement and in the first direction, a center distance between the reference magnetic elements is greater than the range of movement.

According to some embodiments, a spacer element is disposed between the reference magnetic elements, and when viewed in the first direction, the reference magnetic elements partially overlap the spacer element, and the spacer element has a non-magnetic permeability material.

According to some embodiments, the optical element driving mechanism further includes a plurality of adhesive members disposed between the spacer element and the reference magnetic elements.

According to some embodiments, the driving assembly further includes a driving coil, a driving magnetic element and a magnetically conductive element, the driving coil and the driving magnetic element are arranged along a second direction, a winding axis of the driving coil is different from the first direction, the magnetically conductive element corresponds to the driving magnetic element, and the driving magnetic element includes: a first surface, perpendicular to the second direction; a second surface, perpendicular to a third direction, and the third direction is perpendicular to the first direction and the second direction; and a third surface, not parallel to the first surface and the second surface and facing the magnetically conductive element.

According to some embodiments, a connecting line of a center of the magnetically conductive element and a center of the driving magnetic element is not parallel to the second direction, and the magnetically conductive element is movable relative to the driving magnetic element.

According to some embodiments, when viewed in the second direction, the magnetically conductive element does not overlap the driving magnetic element.

According to some embodiments, when viewed in the second direction, the driving coil partially overlaps the magnetically conductive element.

According to some embodiments, when viewed in the third direction, the magnetically conductive element is disposed between the driving magnetic element and the driving coil.

According to some embodiments, the optical element driving mechanism further includes a guiding assembly configured to guide the movable assembly to move relative to the fixed assembly in the first direction, and the guiding assembly is disposed between the magnetically conductive element and the driving magnetic element.

According to some embodiments, the driving assembly is configured to drive the movable assembly to move relative to the fixed assembly in the first direction within a range of movement, the optical element driving mechanism further includes a guiding assembly configured to guide the movable assembly to move relative to the fixed assembly in the first direction, and the guiding assembly includes: a first guiding groove; a first guiding trench, corresponding to the first guiding groove and having a boundary, wherein an extending direction of the boundary is perpendicular to the first direction; and a first intermediate element, disposed between the first guiding groove and the first guiding trench; wherein the driving assembly further includes a driving coil and a driving magnetic element, arranged in a second direction, when viewed in the second direction, and when the movable assembly is at any position within the range of movement, the first guiding groove does not overlap the boundary.

According to some embodiments, the optical element driving mechanism further includes a plurality of blocking portions, disposed on two sides of the first guiding groove, and the blocking portions are configured to limit the range of movement of the first intermediate elements in the first direction.

According to some embodiments, the guiding assembly further includes a plurality of first guiding grooves, and the first guiding grooves are arranged in the first direction.

According to some embodiments, the guiding assembly further includes: a second guiding groove; a second guiding trench, corresponding to the second guiding groove; and a second intermediate element, disposed between the second guiding groove and the second guiding trench; wherein when viewed in the first direction, the first guiding groove and the second guiding groove each have a V-shaped structure, respectively corresponding to the first intermediate element and the second intermediate element, and the first guiding trench or the second guiding trench has a non-V-shaped structure.

According to some embodiments, the first guiding groove and the second guiding groove are arranged along a third direction, the first guiding trench has two first surfaces which are not parallel to the third direction, the first guiding groove has two second surfaces which are not parallel to the third direction, wherein a shortest distance between the first surfaces is different from a shortest distance between the second surfaces.

According to some embodiments, the driving assembly further includes a driving magnetic element and a driving coil, the optical element driving mechanism further includes a magnetically conductive fixing member, the driving magnetic element is disposed between the magnetically conductive fixing member and the driving coil, and the magnetically conductive fixing member is configured to fix the driving magnetic element.

According to some embodiments, the driving assembly further includes a driving magnetic element and a driving coil, a plurality of grooves are located around the driving coil, and an adhesive member is accommodated in each of the grooves.

According to some embodiments, the driving assembly further includes: a driving magnetic element; and a plurality of driving coils, arranged along a second direction and corresponding to the driving magnetic element, wherein each driving coil has a first segment portion and a second segment portion, the second segment portion is perpendicular to the first direction, the driving magnetic element is disposed between the first segment portions, and when viewed in the second direction, the driving magnetic element partially overlaps the first segment portions; wherein when a current flows to the driving assembly, directions of the current in the first segment portions are opposite.

According to some embodiments, the driving assembly further includes: a plurality of driving magnetic elements; and a driving coil, corresponding to the driving magnetic elements, wherein the driving coil has a first segment portion and a second segment portion, the second segment portion is perpendicular to the first direction, magnetic poles of the driving magnetic elements are arranged in the same direction, and the first segment portion is disposed between the driving magnetic elements; wherein the driving magnetic elements are arranged along a second direction, and when viewed in the second direction, the driving magnetic elements partially overlap the first segment portion.

According to some embodiments, the driving assembly further includes: a driving coil, disposed on the movable assembly; a first driving magnetic element, corresponding to the driving coil and disposed on the fixed assembly; a second driving magnetic element, corresponding to the driving coil and disposed on the fixed assembly, wherein the driving coil is disposed between the first driving magnetic element and the second driving magnetic element, and the first driving magnetic element and the second driving magnetic element are arranged along a second direction; and a magnetically conductive element, corresponding to the first driving magnetic element, and when viewed in the first direction, the magnetically conductive element is located between the first driving magnetic element and the driving coil.

According to some embodiments, a shortest distance between the first driving magnetic element and the driving coil is greater than a shortest distance between the second driving magnetic element and the driving coil.

The present disclosure provides an optical element driving mechanism including an optical element module, a driving assembly, a movable member, and a fixed assembly. The driving assembly can generate an electromagnetic driving force to drive the movable member to move relative to the fixed assembly. The movable member can push the flow channel by the deforming member, so that a portion of the liquid in the flow channel flows to the optical element, thereby causing the optical element to deform. Thus, the optical properties of the optical element are changed so as to achieve the effect of optical zoom.

In addition, the magnetically conductive element may be disposed in the movable member. Because a magnetic attraction force is formed between the magnetically conductive element and the first driving magnetic element of the driving assembly, the movable member 108 is in contact with the first intermediate elements and the second intermediate elements, so that the first intermediate elements and the second intermediate elements are stably disposed in the first guiding groove and the second guiding groove, respectively.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
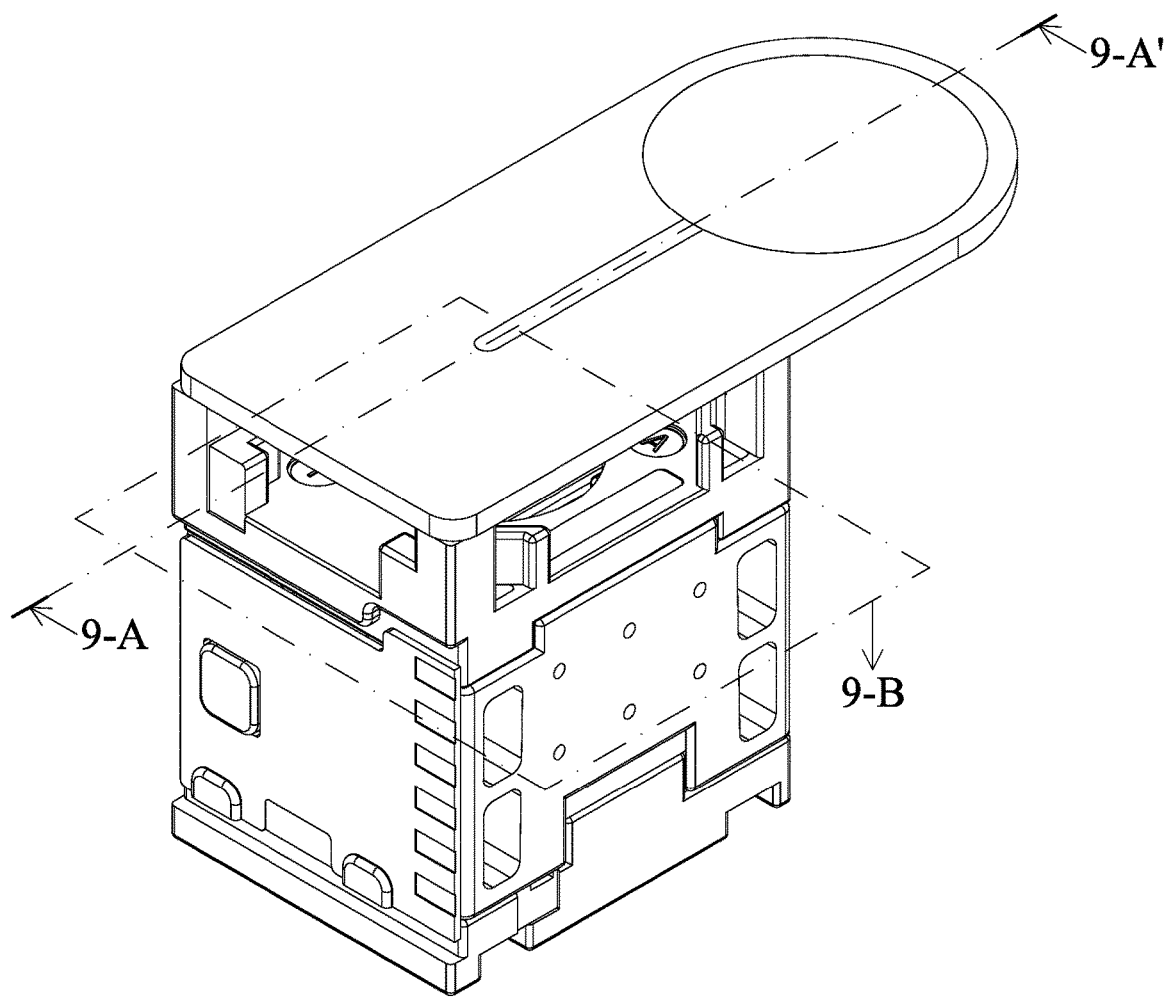
FIG. 1 is a schematic diagram of an optical element driving mechanism 9-100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
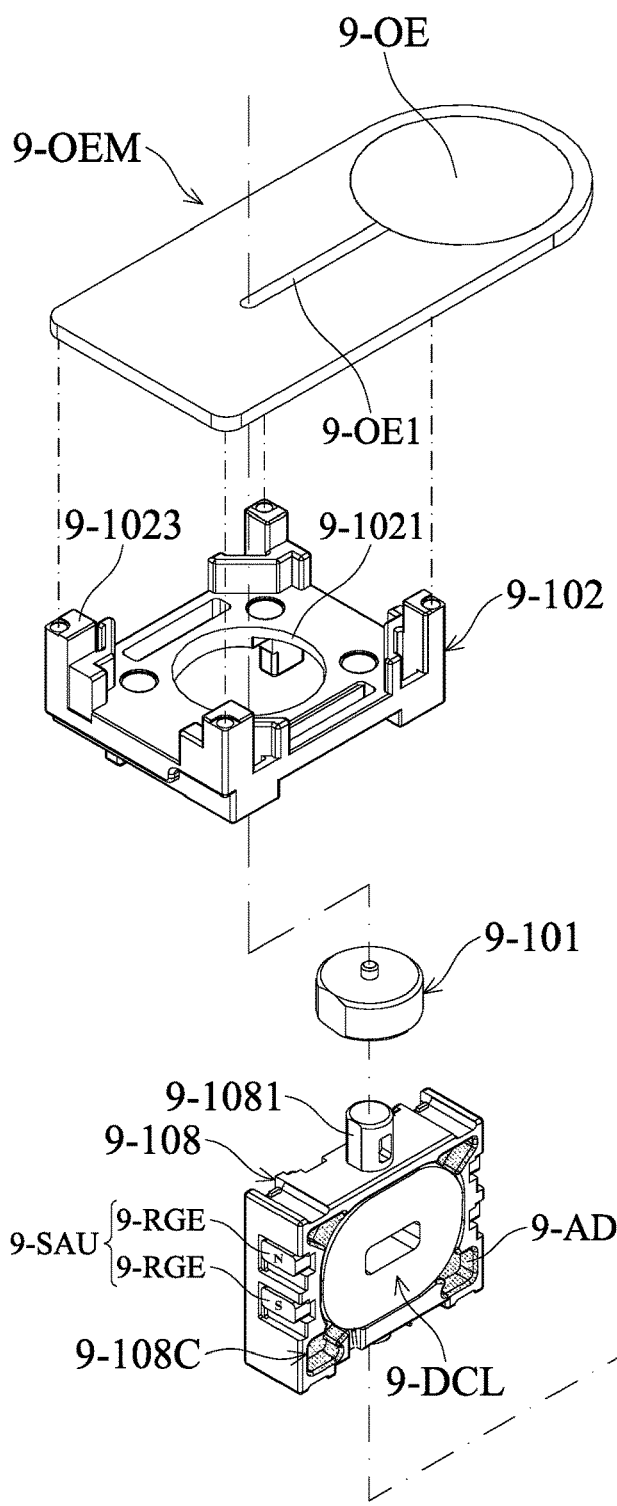
FIG. 2 is an exploded diagram of the optical element driving mechanism 9-100 according to an embodiment of the present disclosure.
Figure 2:
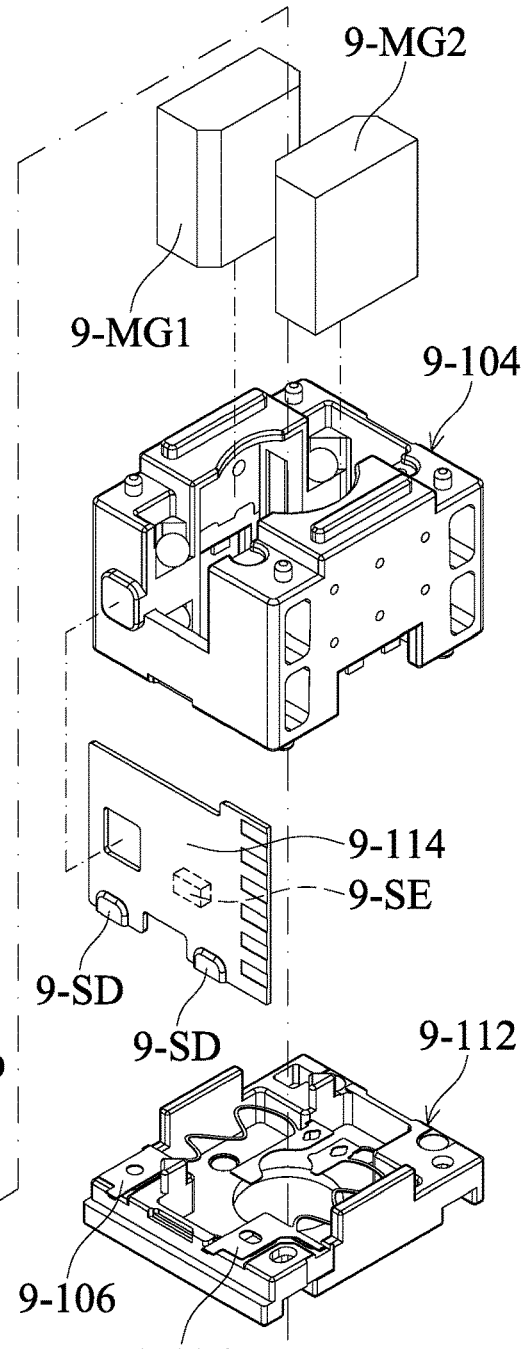
Figure 3:
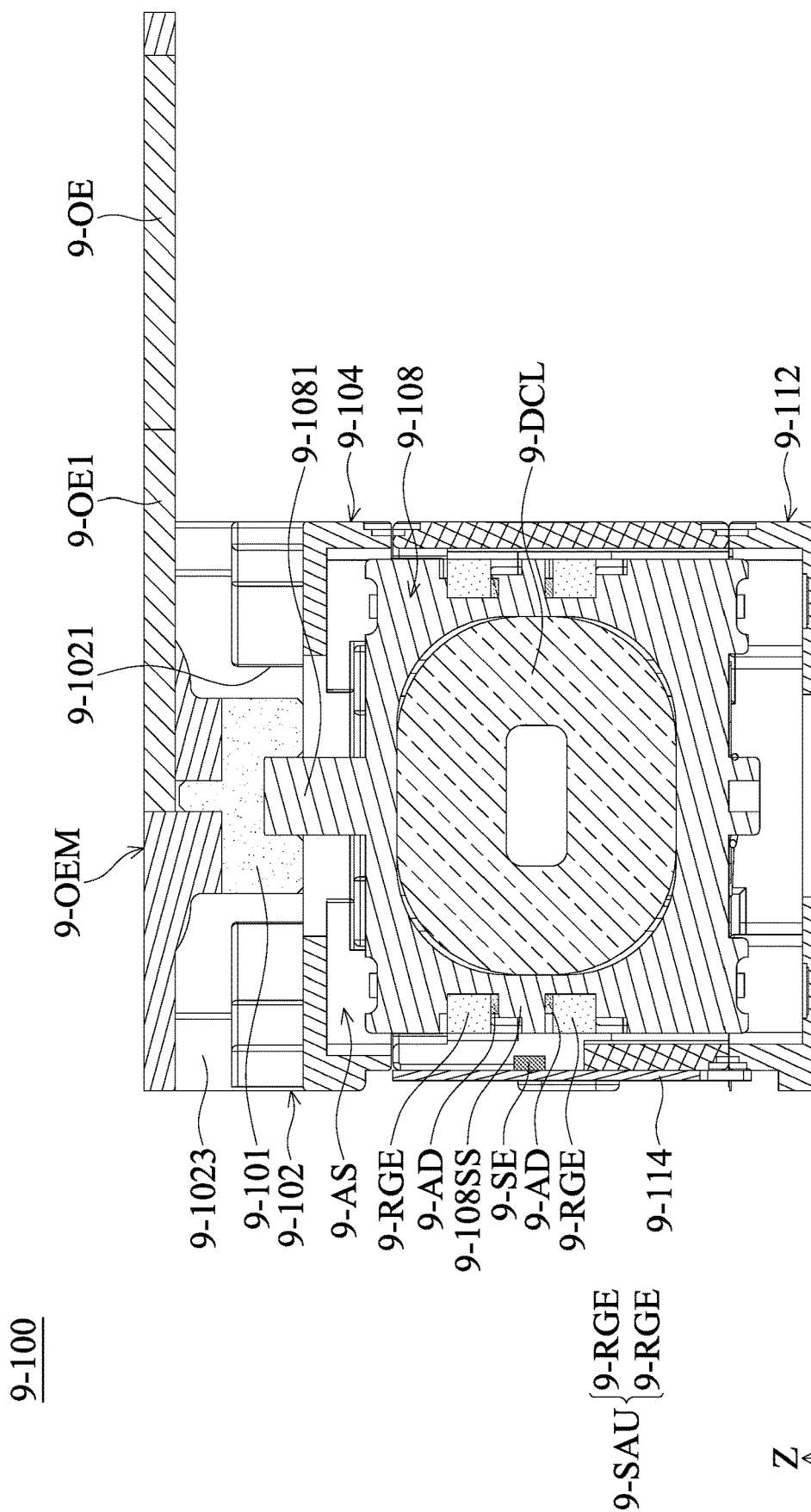
FIG. 3 is a cross-sectional diagram of the optical element driving mechanism 9-100 along line 9-A-9-A' in FIG. 1 according to an embodiment of the present disclosure.

Please refer to FIG. 1 to FIG. 3. FIG. 1 is a schematic diagram of an optical element driving mechanism 9-100 according to an embodiment of the present disclosure, FIG. 2 is an exploded diagram of the optical element driving mechanism 9-100 according to an embodiment of the present disclosure, and FIG. 3 is a cross-sectional diagram of the optical element driving mechanism 9-100 along line 9-A-9-A' in FIG. 1 according to an embodiment of the present disclosure. In this embodiment, the optical element driving mechanism 9-100 includes an optical element module 9-OEM, a fixed assembly 9-FA, a movable assembly 9-MA, a driving assembly 9-DA, and a position-sensing assembly 9-SA. The movable assembly 9-MA corresponds to an optical element 9-OE of the optical element module 9-OEM, and the movable assembly 9-MA is movable relative to the fixed assembly 9-FA. The driving assembly 9-DA is configured to drive the movable assembly 9-MA to move relative to fixed assembly 9-FA, and the position-sensing assembly 9-SA is configured to sense the position and movement of the movable assembly 9-MA relative to fixed assembly 9-FA.

As shown in FIG. 2, the fixed assembly 9-FA may include a top frame 9-102, a side frame 9-104, and a base 9-112. The top frame 9-102 is fixedly connected to the side frame 9-104, and the side frame 9-104 is fixedly connected to the base 9-112. The top frame 9-102 has an opening 9-1021 and four protruding columns 9-1023, and the optical element module 9-OEM is fixedly disposed on these protruding columns 9-1023. The side frame 9-104 and the base 9-112 may form an accommodating space 9-AS (FIG. 3), configured to accommodate the movable assembly 9-MA and the driving assembly 9-DA. In addition, the fixed assembly 9-FA may further include a circuit board 9-114, which is fixedly disposed on one side of the side frame 9-104.

The movable assembly 9-MA includes a movable member 9-108 and two elastic members 9-106. The movable member 9-108 is movably disposed in the accommodating space 9-AS, and the elastic member 9-106 is disposed the side frame 9-104 and the base 9-112. In addition, the driving assembly 9-DA may include a driving coil 9-DCL, a first driving magnetic element 9-MG1, and a second driving magnetic element 9-MG2.

As shown in FIG. 2, the driving coil 9-DCL is disposed in the movable member 9-108. The movable member 9-108 may have a plurality of grooves 9-108C located around the driving coil 9-DCL, and an adhesive member 9-AD can be accommodated in each groove 9-108C, so that the driving coil 9-DCL is fixed in the movable member 9-108. The first driving magnetic element 9-MG1 and the second driving magnetic element 9-MG2 correspond to the driving coil 9-DCL and are fixedly provided in the fixed assembly 9-FA. Specifically, the first driving magnetic element 9-MG1 and the second driving magnetic element 9-MG2 are disposed on the side frame 9-104 and are located in the accommodating space 9-AS. In addition, the driving coil 9-DCL is electrically connected to the circuit board 9-114 via two the elastic members 9-106. For example, the driving coil 9-DCL is electrically connected to the circuit board 9-114 by solders 9-SD in FIG. 2.

In this embodiment, the position-sensing assembly 9-SA includes a sensed unit 9-SAU and a sensing element 9-SE. The sensing element 9-SE is disposed on the circuit board 9-114 and corresponds to the sensed unit 9-SAU. The sensed unit 9-SAU may have a plurality of reference magnetic elements 9-RGE. These reference magnetic elements 9-RGE are arranged in a first direction (such as the Z-axis), the sensed unit 9-SAU and the sensing element 9-SE are arranged in an arrangement direction (the X-axis), and the first direction is not parallel to the arrangement direction.

As shown in FIG. 2 and FIG. 3, the optical element 9-OE is a liquid lens, and the optical element module 9-OEM has a flow channel 9-0E1, which is communicated with the optical element 9-OE. A translucent liquid is disposed in the flow channel 9-0E1 and the optical element 9-OE. Furthermore, the optical element driving mechanism 9-100 may further include a deforming member 9-101, a protruding pillar 9-1081 of the movable member 9-108 is inserted into the deforming member 9-101, and the deforming member 9-101 is in contact with an end of the flow channel 9-OE1 (such as the left end in FIG. 3).

In this embodiment, one or both sides of the optical element 9-OE and the flow channel 9-OE1 along the Z-axis may be a thin film structure. When the driving coil 9-DCL is provided with electricity, the driving coil 9-DCL acts with the first driving magnetic element 9-MG1 and the second driving magnetic element 9-MG2 to generate an electromagnetic driving force. This electromagnetic driving force drives the movable member 9-108 to move along the Z-axis. Therefore, the movable member 9-108 and the deforming member 9-101 push the flow channel 9-OE1 so that a portion of the liquid in the flow channel 9-OE1 flows to the optical element 9-OE, thereby causing the optical element 9-OE to deform. Thus, the optical properties of the optical element 9-OE are changed so as to achieve the effect of optical zoom.

As shown in FIG. 3, a separating structure 9-108SS (a spacer element) can be formed on the movable member 9-108, and the separating structure 9-108SS is disposed between these reference magnetic elements 9-RGE. When viewed in the first direction (the Z-axis), the reference magnetic elements 9-RGE partially overlap the separating structure 9-108SS, and the separating structure 9-108SS has a non-magnetic permeability material, such as a plastic material. Furthermore, the optical element driving mechanism 9-100 may include a plurality of adhesive members 9-AD disposed between the separating structure 9-108SS and the corresponding reference magnetic element 9-RGE, so that the reference magnetic elements 9-RGE are fixed to the movable member 9-108.

Figure 4:
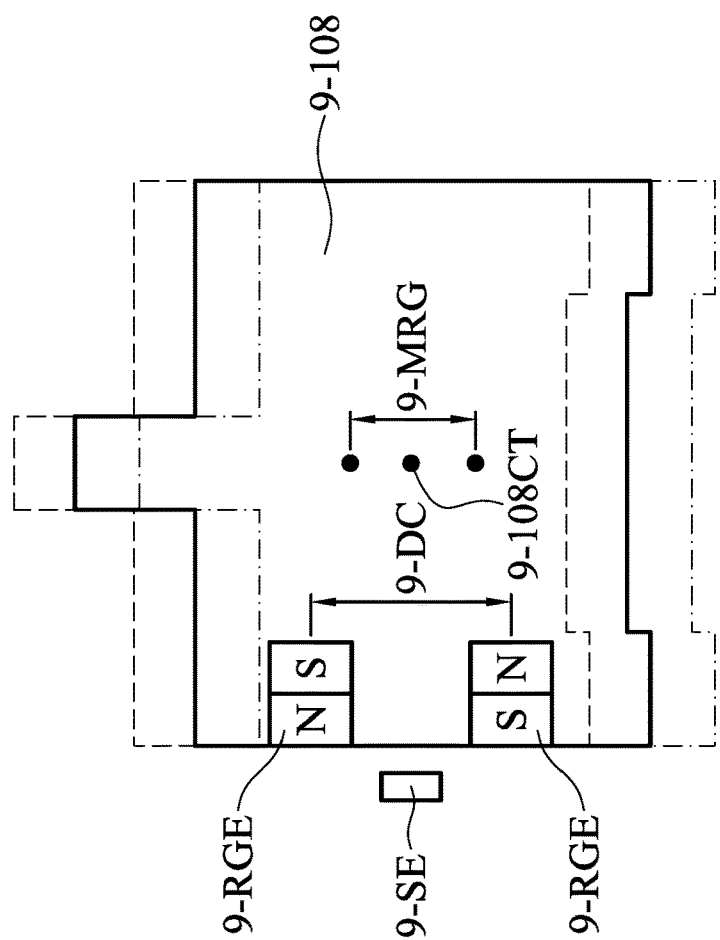
FIG. 4 is a schematic diagram of the movable member 9-108 and the position-sensing assembly 9-SA according to an embodiment of the present disclosure.

Next, please refer to FIG. 4, which is a schematic diagram of the movable member 9-108 and the position-sensing assembly 9-SA according to an embodiment of the present disclosure. As shown in FIG. 4, the arrangement direction of the magnetic poles (the N-pole, and the S-pole) of each of these reference magnetic elements 9-RGE is along the X-axis and is not parallel to the aforementioned first direction (the Z-axis). In addition, the arrange sequences of the magnetic poles of these reference magnetic elements 9-RGE are opposite. Specifically, in FIG. 4, the N-pole of the upper reference magnetic element 9-RGE faces the sensing element 9-SE, and the N-pole of the lower reference magnetic element 9-RGE faces the movable member 9-108.

Furthermore, as shown in FIG. 4, the driving assembly 9-DA of the present disclosure can drive the movable member 9-108 of the movable assembly 9-MA to move relative to the fixed assembly 9-FA in the first direction (the Z-axis) within a range of movement 9-MRG. The range of movement 9-MRG may be a range of movement of a center 9-108CT of the movable member 9-108 along the Z-axis. In the first direction, the center distance DC between these reference magnetic elements 9-RGE is greater than the range of movement 9-MRG. Based on the above configuration, the position-sensing assembly 9-SA can accurately sense the displacement of the movable member 9-108 along the Z-axis.

Figure 5:
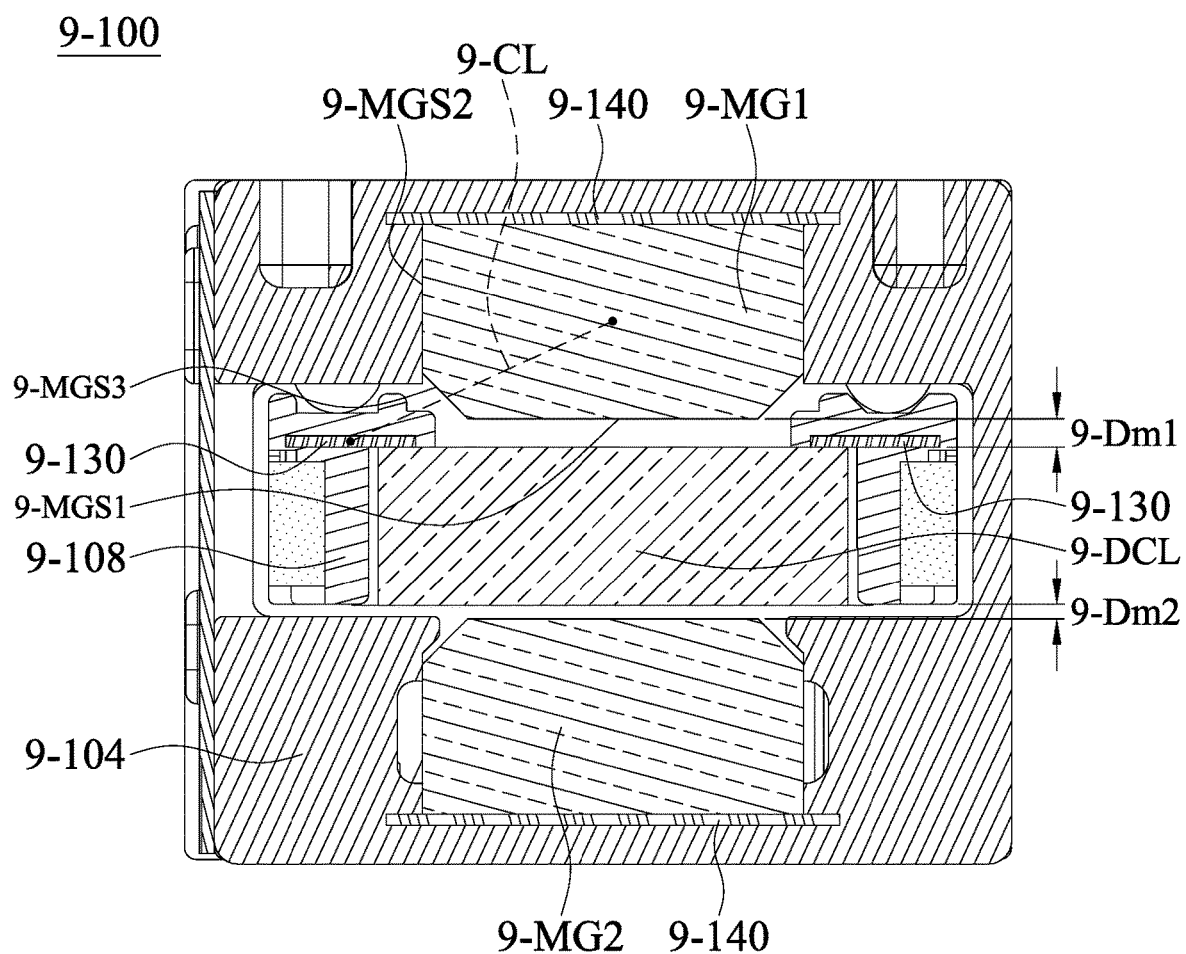
FIG. 5 is a schematic cross-sectional view of the optical element driving mechanism 9-100 along the plane 9-B in FIG. 1 according to an embodiment of the disclosure.

Please refer to FIG. 5, which is a schematic cross-sectional view of the optical element driving mechanism 9-100 along the plane 9-B in FIG. 1 according to an embodiment of the disclosure. As shown in FIG. 5, the driving coil 9-DCL, the first driving magnetic element 9-MG1, and the second driving magnetic element 9-MG2 are arranged along a second direction (the Y-axis), and the driving coil 9-DCL is disposed between the first driving magnetic element 9-MG1 and the second driving magnetic element 9-MG2. It should be noted that the shortest distance 9-Dm1 between the first driving magnetic element 9-MG1 and the driving coil 9-DCL is greater than the shortest distance 9-Dm2 between the second driving magnetic element 9-MG2 and the driving coil 9-DCL. In addition, a winding axis of the driving coil 9-DCL is parallel to the Y-axis and is different from the first direction (the Z-axis).

The driving assembly 9-DA further includes two magnetically conductive elements 9-130, which is buried in movable member 9-108, and the magnetically conductive elements 9-130 correspond to the first driving magnetic element 9-MG1. For example, They can act with the first driving magnetic element 9-MG1 to generate a magnetic attraction force. When viewed in the first direction (the Z-axis), the magnetically conductive elements 9-130 are located between the first driving magnetic element 9-MG1 and the driving coil 9-DCL.

Furthermore, the first driving magnetic element 9-MG1 includes a first surface 9-MGS1, a second surface 9-MGS2, and a third surface 9-MGS3. The first surface 9-MGS1 is perpendicular to the Y-axis (the second direction), the second surface 9-MGS2 is perpendicular to a third direction (the X-axis), and the third direction is perpendicular to the first direction and the second direction. The third surface 9-MGS3 is not parallel to the first surface 9-MGS1 and the second surface 9-MGS2 and faces the magnetically conductive element 9-130.

As shown in FIG. 5, a connecting line 9-CL of the center of the magnetically conductive element 9-130 and the center of the first driving magnetic element 9-MG1 is not parallel to the second direction (the Y-axis), which means that the two magnetically conductive elements 9-130 are disposed on two sides of the first driving magnetic element 9-MG1. In addition, because the magnetically conductive elements 9-130 are buried in the movable member 9-108, the magnetically conductive elements 9-130 can also move relative to the first driving magnetic element 9-MG1.

In this embodiment, as shown in FIG. 5, when viewed in the second direction (the Y-axis), the magnetically conductive elements 9-130 do not overlap the first driving magnetic element 9-MG1, and the driving coil 9-DCL partially overlaps the magnetically conductive elements 9-130. Furthermore, when viewed in the third direction, the magnetically conductive elements 9-130 are disposed between the first driving magnetic element 9-MG1 and the driving coil 9-DCL.

Furthermore, in this embodiment, the optical element driving mechanism 9-100 may further include two magnetically conductive fixing members 9-140, which are buried in the side frame 9-104. The first driving magnetic element 9-MG1 is disposed between the corresponding magnetically conductive fixing member 9-140 and the driving coil 9-DCL, the second driving magnetic element 9-MG2 is disposed between the corresponding magnetically conductive fixing member 9-140 and the driving coil 9-DCL, and these magnetically conductive fixing members 9-140 are configured to fix the first driving magnetic element 9-MG1 and the second driving magnetic element 9-MG2. For example, a magnetic attraction force is generated between the first driving magnetic element 9-MG1 and the corresponding magnetically conductive fixing member 9-140, so that the first driving magnetic element 9-MG1 is firmly attracted to the corresponding magnetically conductive fixing member 9-140.

Figure 6:
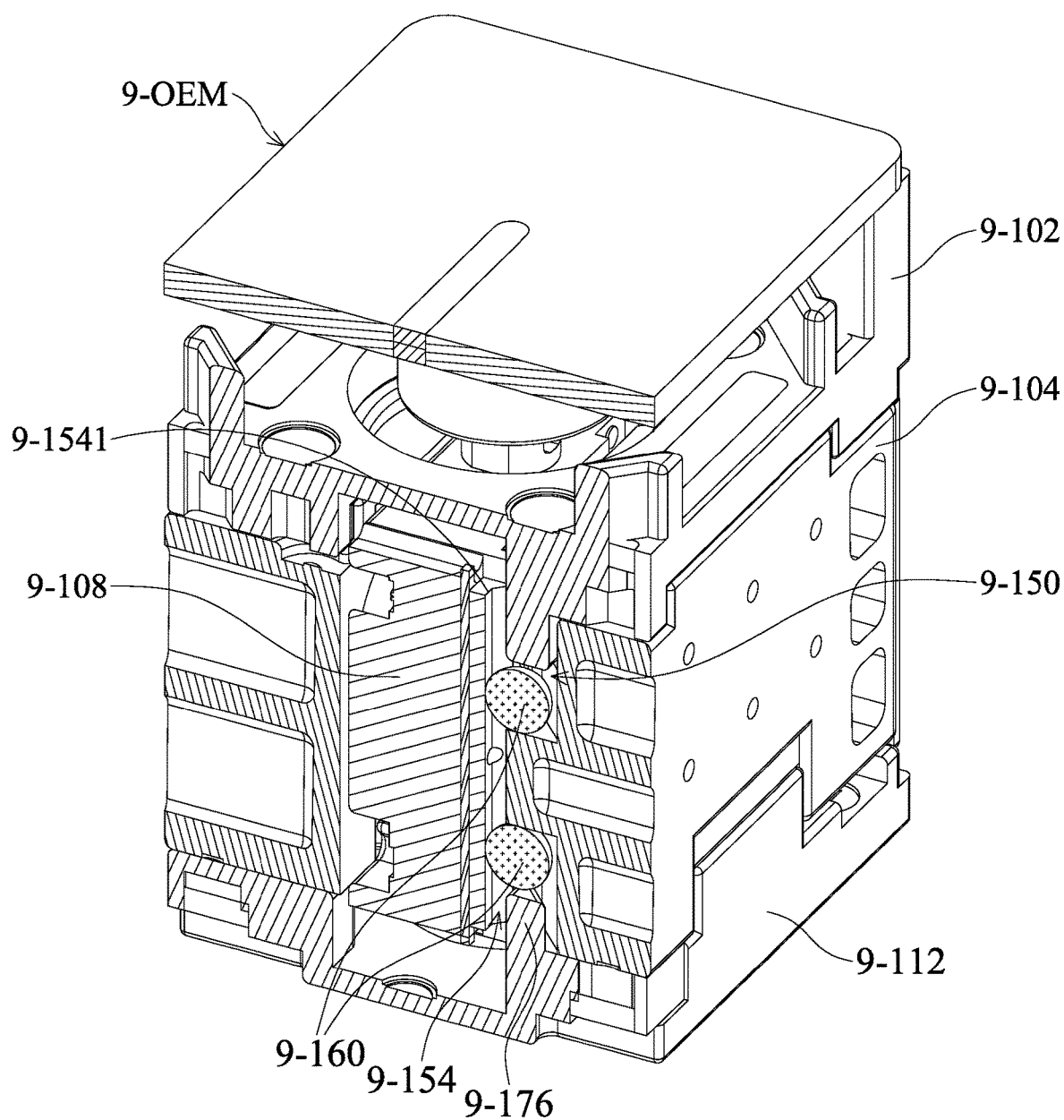
FIG. 6 is a perspective sectional view of the optical element driving mechanism 9-100 according to an embodiment of the present disclosure.
Figure 7:
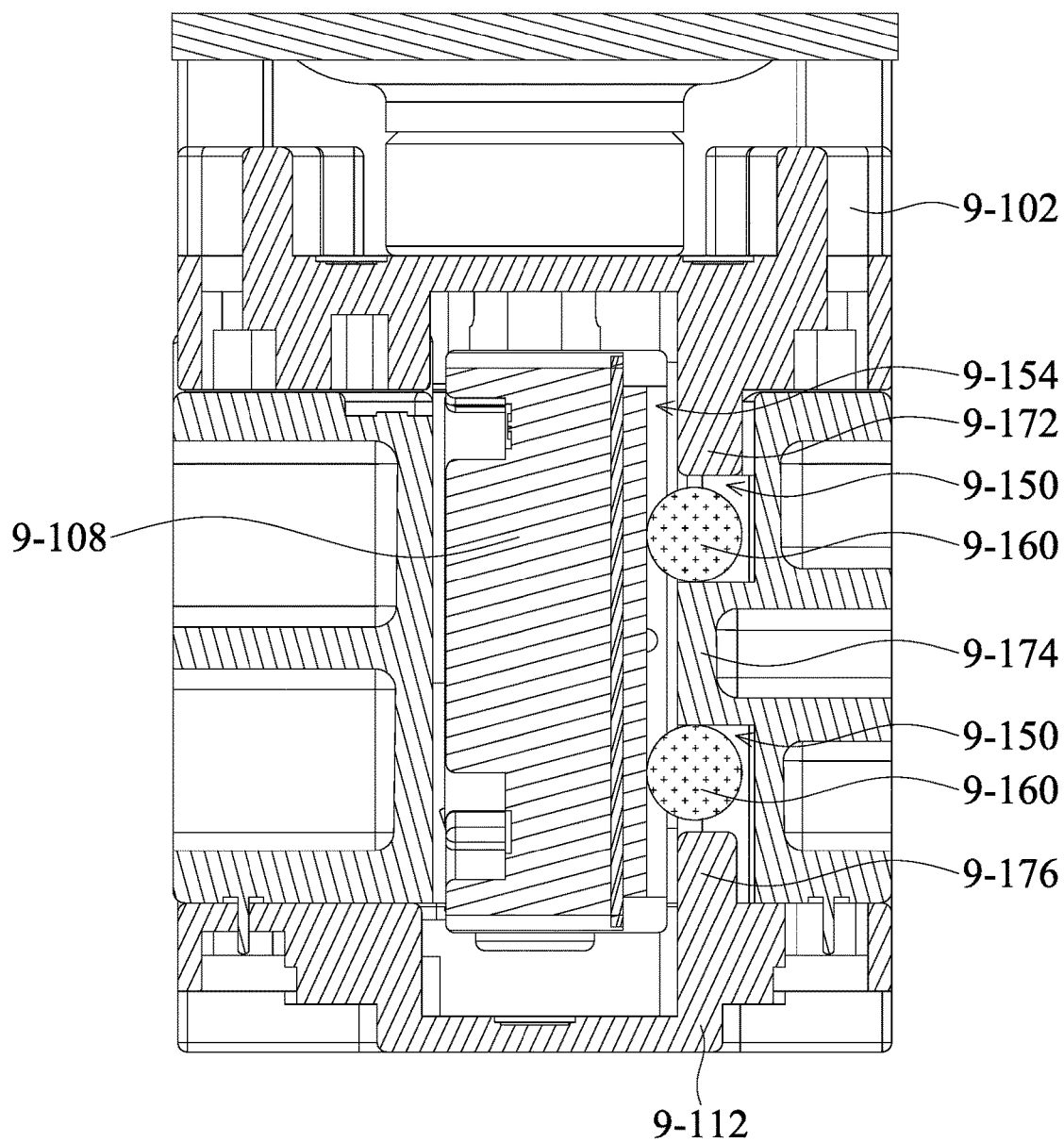
FIG. 7 is a cross-sectional view of the optical element driving mechanism 9-100 along the YZ plane according to an embodiment of the present disclosure.
Figure 8:
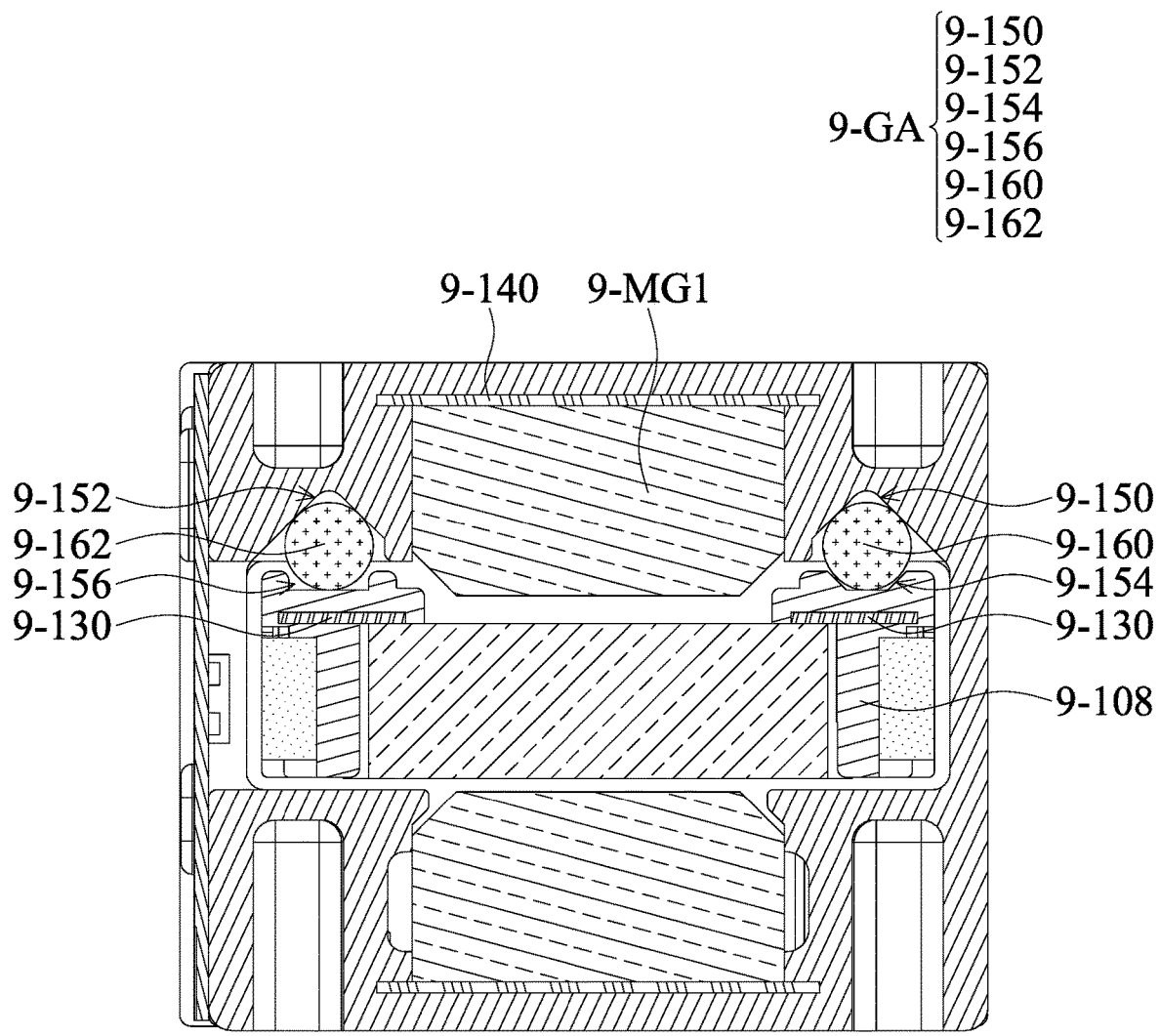
FIG. 8 is a cross-sectional view of the optical element driving mechanism 9-100 along the XY plane according to an embodiment of the present disclosure.

Please refer to FIG. 6 to FIG. 8. FIG. 6 is a perspective sectional view of the optical element driving mechanism 9-100 according to an embodiment of the present disclosure, FIG. 7 is a cross-sectional view of the optical element driving mechanism 9-100 along the YZ plane according to an embodiment of the present disclosure, and FIG. 8 is a cross-sectional view of the optical element driving mechanism 9-100 along the XY plane according to an embodiment of the present disclosure. In this embodiment, the optical element driving mechanism 9-100 may further include a guiding assembly 9-GA configured to guide the movable assembly 9-MA to move relative to the fixed assembly 9-FA in the first direction, and the guiding assembly 9-GA is disposed between the magnetically conductive element 9-130 and the first driving magnetic element 9-MG1.

In this embodiment, the guiding assembly 9-GA may include two first guiding grooves 9-150, two second guiding grooves 9-152, a first guiding trench 9-154, and a second guiding trench 9-156, two first intermediate elements 9-160, and two second intermediate elements 9-162. As shown in FIG. 6 to FIG. 8, the two first guiding grooves 9-150 are arranged in the first direction (the Z-axis), and the two second guiding grooves 9-152 are arranged in the first direction (the Z-axis), and the first guiding grooves 9-150 and the second guiding grooves 9-152 respectively correspond to the first guiding trench 9-154 and the second guiding trench 9-156.

As shown in FIG. 8, the first intermediate element 9-160 and the second intermediate element 9-162 may be balls, the first intermediate element 9-160 is disposed between the first guiding groove 9-150 and the first guiding trench 9-154, and the second intermediate element 9-162 is disposed between the second guiding groove 9-152 and the second guiding trench 9-156. In addition, as shown in FIG. 6 and FIG. 7, the optical element driving mechanism 9-100 may further include a plurality of blocking portions 9-172, 9-174, and 9-176. The blocking portions 9-172, 9-174 are disposed on two sides of the first guiding groove 9-150 adjacent to the top frame 9-102, the blocking portions 9-174 and 9-176 are disposed on two sides of the first guiding groove 9-150 adjacent to the base 9-112, and the blocking portions are configured to limit the range of movement of the first intermediate elements 9-160 in the first direction (the Z-axis).

Furthermore, as shown in FIG. 8, when viewed in the first direction (the Z-axis), the first guiding groove 9-150 and the second guiding groove 9-152 each have a V-shaped structure, respectively corresponding to the first intermediate element 9-160 and the second intermediate element 9-162, and the first guiding trench 9-154 and/or the second guiding trench 9-156 have a non-V-shaped structure.

It should be noted that, as shown in FIG. 6, the first guiding trench 9-154 corresponding to the first guiding groove 9-150 may have a boundary 9-1541, and an extending direction (the X-axis) of the boundary 9-1541 is perpendicular to the first direction (the Z-axis). When viewed in the second direction (the Y-axis), and when the movable member 9-108 of the movable assembly 9-MA is at any position within the range of movement 9-MRG, the first guiding groove 9-150 does not overlap the boundary 9-1541. That is, the first intermediate elements 9-160 and the second intermediate elements 9-162 do not separate from the corresponding first guiding groove 9-150 and the second guiding groove 9-152.

In addition, as shown in FIG. 8, because a magnetic attraction force is formed between the magnetically conductive element 9-130 and the first driving magnetic element 9-MG1, the movable member 9-108 is in contact with the first intermediate elements 9-160 and the second intermediate elements 9-162, so that the first intermediate elements 9-160 and the second intermediate elements 9-162 are stably disposed in the first guiding groove 9-150 and the second guiding groove 9-152, respectively.

Figure 9:
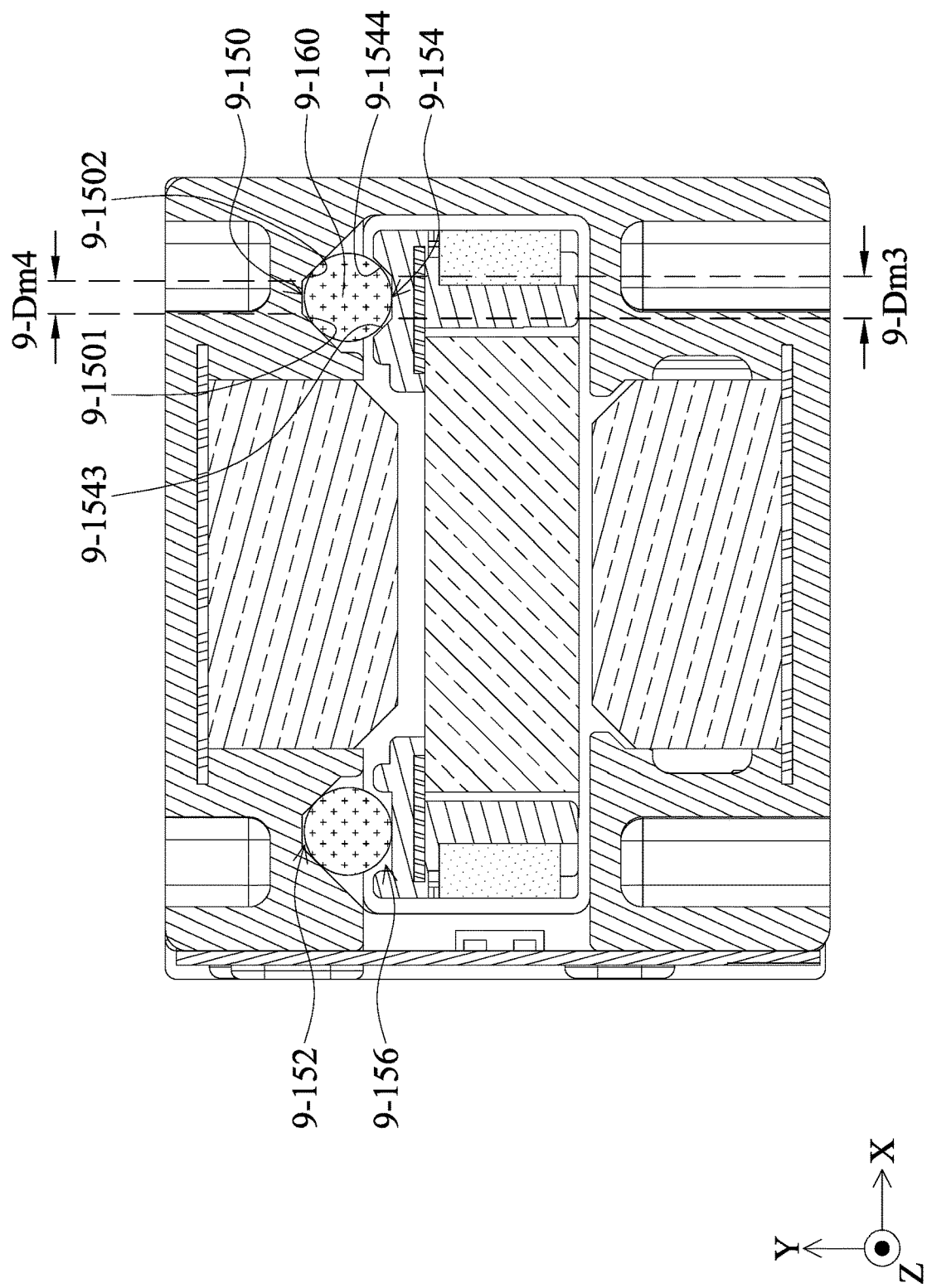
FIG. 9 is a schematic cross-sectional view of the optical element driving mechanism 9-100 along the XY plane according to another embodiment of the present disclosure.

Next, please refer to FIG. 9, which is a schematic cross-sectional view of the optical element driving mechanism 9-100 along the XY plane according to another embodiment of the present disclosure. In this embodiment, the first guiding grooves 9-150 and the second guiding grooves 9-152 have a non-V-shaped structure. Specifically, the first guiding trench 9-154 has two first surfaces 9-1543, 9-1544, and the first surfaces 9-1543, 9-1544 are not parallel to the third direction (the X-axis). The first guiding groove 9-150 has two second surfaces 9-1501, 9-1502, and the second surfaces 9-1501, 9-1502 are not parallel to the third direction, either. As shown in FIG. 9, a shortest distance 9-Dm3 between the first surfaces 9-1543, 9-1544 is different from a shortest distance 9-Dm4 between the second surfaces 9-1501, 9-1502.

Figure 10:
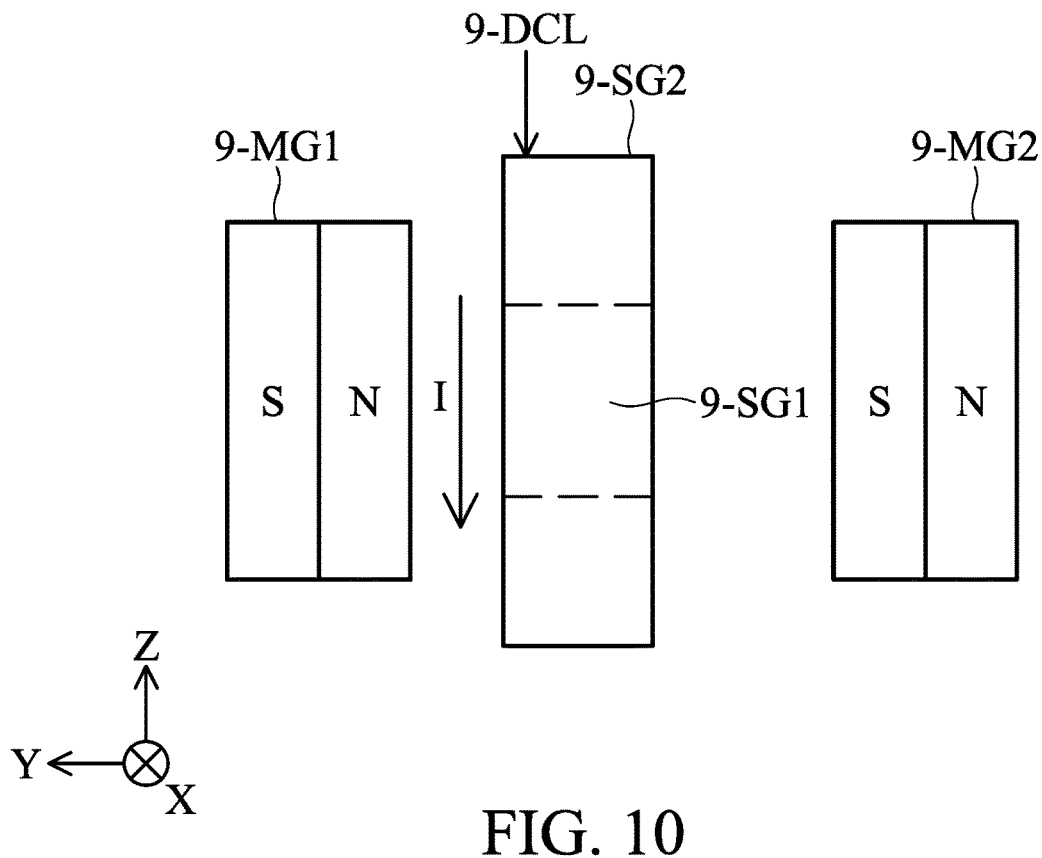
FIG. 10 is a front view of a partial structure of the optical element driving mechanism 9-100 according to an embodiment of the present disclosure.
Figure 11:
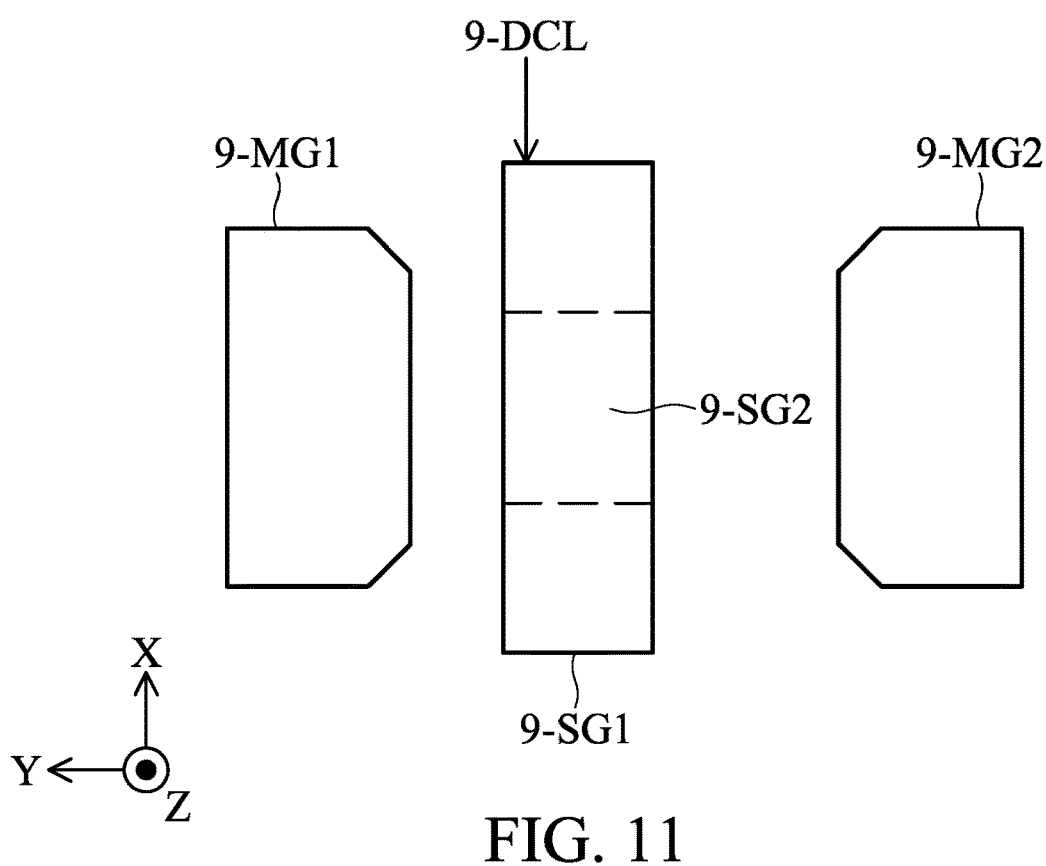
FIG. 11 is a top view of a partial structure of the optical element driving mechanism 9-100 according to an embodiment of the present disclosure.

Please refer to FIG. 10 and FIG. 11. FIG. 10 is a front view of a partial structure of the optical element driving mechanism 9-100 according to an embodiment of the present disclosure, and FIG. 11 is a top view of a partial structure of the optical element driving mechanism 9-100 according to an embodiment of the present disclosure. In this embodiment, the driving coil 9-DCL has a first segment portion 9-SG1 and a second segment portion 9-SG2, and the second segment portion 9-SG2 is perpendicular to the first direction (the Z-axis). As shown in FIG. 10, the magnetic poles of the first driving magnetic element 9-MG1 and the second driving magnetic element 9-MG2 are arranged along the same direction, for example, along the Y-axis.

In addition, as shown in FIG. 11, the first segment portion 9-SG1 is disposed between the first driving magnetic element 9-MG1 and the second driving magnetic element 9-MG2, and when viewed in the second direction (the Y-axis), the first driving magnetic element 9-MG1 and the second driving magnetic element 9-MG2 partially overlap the first segment portion 9-SG1.

Figure 12:
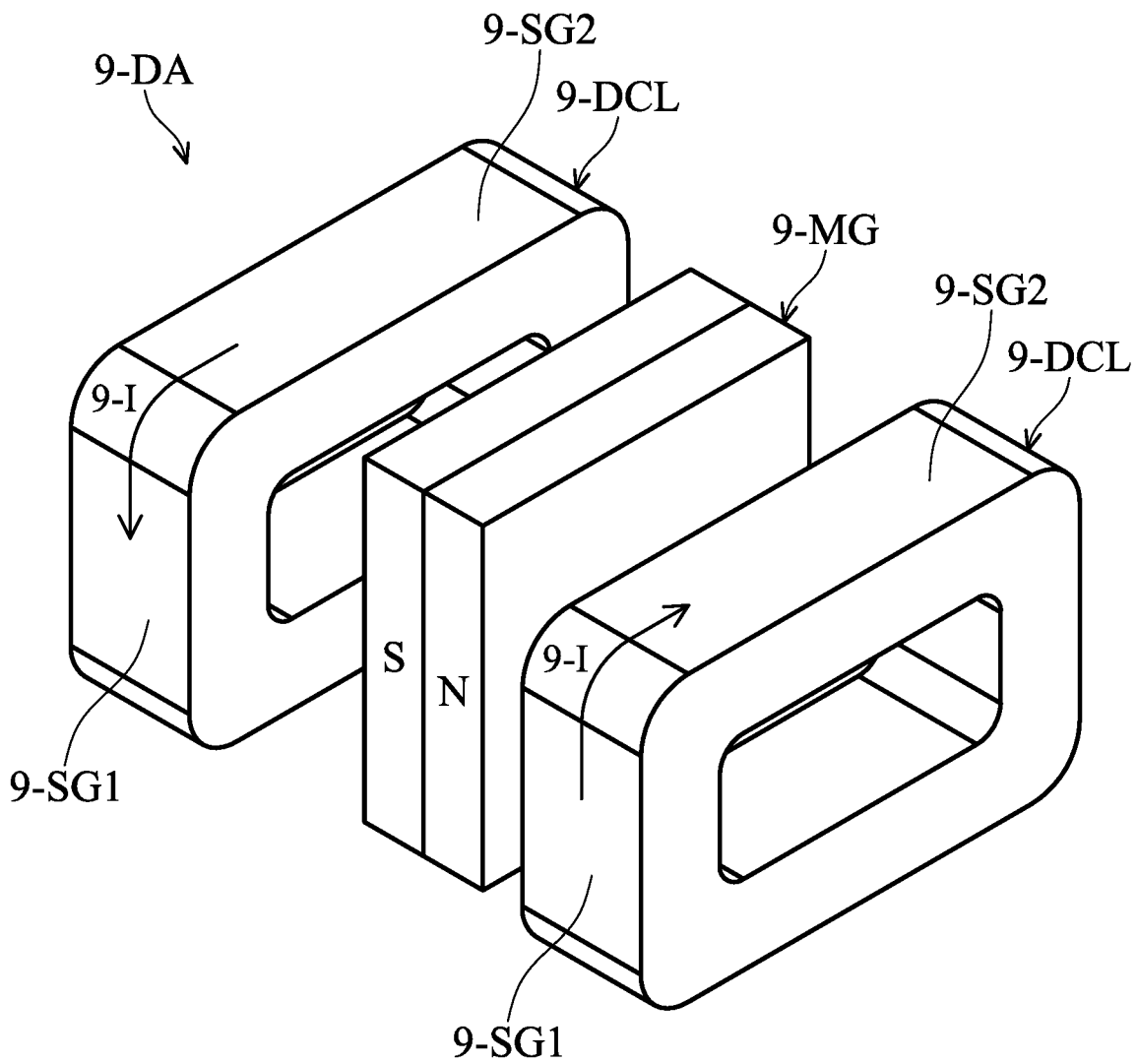
FIG. 12 is a schematic perspective view of a partial structure of the optical element driving mechanism 9-100 according to another embodiment of the present disclosure.

Next, please refer to FIG. 12, which is a schematic perspective view of a partial structure of the optical element driving mechanism 9-100 according to another embodiment of the present disclosure. In this embodiment, the driving assembly 9-DA includes a single driving magnetic element 9-MG and two driving coils 9-DCL. The driving magnetic element 9-MG can be disposed in the movable member 9-108, and the two driving coils 9-DCL are installed in the side frame 9-104 and correspond to the driving magnetic element 9-MG. The driving magnetic element 9-MG and the two driving coils 9-DCL are arranged in the second direction (the Y-axis).

Each driving coil 9-DCL has a first segment portion 9-SG1 and a second segment portion 9-SG2. The second segment portion 9-SG2 is perpendicular to the first direction (the Z-axis), and the driving magnetic element 9-MG is disposed between these first segment portions 9-SG1. When viewed in the second direction, the driving magnetic element 9-MG partially overlaps these first segment portions 9-SG1. In addition, when a current 9-I flows to the driving assembly 9-DA, as shown in FIG. 12, the directions of the current 9-I in these first segment portions 9-SG1 are opposite to each other. For example, a direction of the current 9-I in the left first segment portion 9-SG1 is opposite to a direction of the current 9-I in the right first segment portion 9-SG1.

The present disclosure provides an optical element driving mechanism including an optical element module 9-OEM, a driving assembly 9-DA, a movable member 9-108, and a fixed assembly 9-FA. The driving assembly 9-DA can generate an electromagnetic driving force to drive the movable member 9-108 to move relative to the fixed assembly 9-FA. The movable member 9-108 can push the flow channel 9-OE1 by the deforming member 9-101, so that a portion of the liquid in the flow channel 9-OE1 flows to the optical element 9-OE, thereby causing the optical element 9-OE to deform. Thus, the optical properties of the optical element 9-OE are changed so as to achieve the effect of optical zoom.

In addition, the magnetically conductive element 9-130 may be disposed in the movable member 9-108. Because a magnetic attraction force is formed between the magnetically conductive element 9-130 and the first driving magnetic element 9-MG1 of the driving assembly 9-DA, the movable member 9-108 is in contact with the first intermediate elements 9-160 and the second intermediate elements 9-162, so that the first intermediate elements 9-160 and the second intermediate elements 9-162 are stably disposed in the first guiding groove 9-150 and the second guiding groove 9-152, respectively.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a fixed assembly;
a movable assembly, corresponding to an optical element, and the movable assembly being movable relative to the fixed assembly;
a driving assembly, configured to drive the movable assembly to move relative to the fixed assembly; and
a position-sensing assembly, configured to sense movement of the movable assembly relative to the fixed assembly, the position-sensing assembly comprising:
a sensed unit; and
a sensing element, corresponding to the sensed unit, wherein the sensed unit has a plurality of reference magnetic elements arranged in a first direction, the sensed unit and the sensing element are arranged in an arrangement direction, and the first direction is not parallel to the arrangement direction;
wherein an arrangement direction of magnetic poles of each of the reference magnetic elements is not parallel to the first direction, and arrange sequences of the magnetic poles of the reference magnetic elements are opposite.

2. The optical element driving mechanism as claimed in claim 1, wherein the driving assembly is configured to drive the movable assembly to move relative to the fixed assembly in the first direction within a range of movement and in the first direction, a center distance between the reference magnetic elements is greater than the range of movement.

3. The optical element driving mechanism as claimed in claim 1, wherein a spacer element is disposed between the reference magnetic elements, and when viewed in the first direction, the reference magnetic elements partially overlap the spacer element, and the spacer element has a non-magnetic permeability material.

4. The optical element driving mechanism as claimed in claim 3, wherein the optical element driving mechanism further includes a plurality of adhesive members disposed between the spacer element and the reference magnetic elements.

5. The optical element driving mechanism as claimed in claim 1, wherein the driving assembly further includes a driving coil, a driving magnetic element and a magnetically conductive element, the driving coil and the driving magnetic element are arranged along a second direction, a winding axis of the driving coil is different from the first direction, the magnetically conductive element corresponds to the driving magnetic element, and the driving magnetic element includes:
a first surface, perpendicular to the second direction;
a second surface, perpendicular to a third direction, and the third direction is perpendicular to the first direction and the second direction; and
a third surface, not parallel to the first surface and the second surface and facing the magnetically conductive element.

6. The optical element driving mechanism as claimed in claim 5, wherein a connecting line of a center of the magnetically conductive element and a center of the driving magnetic element is not parallel to the second direction, and the magnetically conductive element is movable relative to the driving magnetic element.

7. The optical element driving mechanism as claimed in claim 6, wherein when viewed in the second direction, the magnetically conductive element does not overlap the driving magnetic element.

8. The optical element driving mechanism as claimed in claim 5, wherein when viewed in the second direction, the driving coil partially overlaps the magnetically conductive element.

9. The optical element driving mechanism as claimed in claim 8, wherein when viewed in the third direction, the magnetically conductive element is disposed between the driving magnetic element and the driving coil.

10. The optical element driving mechanism as claimed in claim 9, wherein the optical element driving mechanism further includes a guiding assembly configured to guide the movable assembly to move relative to the fixed assembly in the first direction, and the guiding assembly is disposed between the magnetically conductive element and the driving magnetic element.

11. The optical element driving mechanism as claimed in claim 1, wherein the driving assembly is configured to drive the movable assembly to move relative to the fixed assembly in the first direction within a range of movement, the optical element driving mechanism further includes a guiding assembly configured to guide the movable assembly to move relative to the fixed assembly in the first direction, and the guiding assembly includes:
- a first guiding groove;
- a first guiding trench, corresponding to the first guiding groove and having a boundary, wherein an extending direction of the boundary is perpendicular to the first direction; and
- a first intermediate element, disposed between the first guiding groove and the first guiding trench;
- wherein the driving assembly further includes a driving coil and a driving magnetic element, arranged in a second direction, when viewed in the second direction, and when the movable assembly is at any position within the range of movement, the first guiding groove does not overlap the boundary.

12. The optical element driving mechanism as claimed in claim 11, wherein the optical element driving mechanism further includes a plurality of blocking portions, disposed on two sides of the first guiding groove, and the blocking portions are configured to limit range of movement of the first intermediate elements in the first direction.

13. The optical element driving mechanism as claimed in claim 11, wherein the guiding assembly further includes a plurality of first guiding grooves, and the first guiding grooves are arranged in the first direction.

14. The optical element driving mechanism as claimed in claim 11, wherein the guiding assembly further includes:
- a second guiding groove;
- a second guiding trench, corresponding to the second guiding groove; and
- a second intermediate element, disposed between the second guiding groove and the second guiding trench;
- wherein when viewed in the first direction, the first guiding groove and the second guiding groove each have a V-shaped structure, respectively corresponding to the first intermediate element and the second intermediate element, and the first guiding trench or the second guiding trench has a non-V-shaped structure.

15. The optical element driving mechanism as claimed in claim 14, wherein the first guiding groove and the second guiding groove are arranged along a third direction, the first guiding trench has two first surfaces which are not parallel to the third direction, the first guiding groove has two second surfaces which are not parallel to the third direction, wherein a shortest distance between the first surfaces is different from a shortest distance between the second surfaces.

16. The optical element driving mechanism as claimed in claim 1, wherein the driving assembly further includes a driving magnetic element and a driving coil, the optical element driving mechanism further includes a magnetically conductive fixing member, the driving magnetic element is disposed between the magnetically conductive fixing member and the driving coil, and the magnetically conductive fixing member is configured to fix the driving magnetic element.

17. The optical element driving mechanism as claimed in claim 1, wherein the driving assembly further includes a driving magnetic element and a driving coil, a plurality of grooves are located around the driving coil, and an adhesive member is accommodated in each of the grooves.

18. The optical element driving mechanism as claimed in claim 1, wherein the driving assembly further includes:
- a driving magnetic element; and
- a plurality of driving coils, arranged along a second direction and corresponding to the driving magnetic element, wherein each driving coil has a first segment portion and a second segment portion, the second segment portion is perpendicular to the first direction, the driving magnetic element is disposed between the first segment portions, and when viewed in the second direction, the driving magnetic element partially overlaps the first segment portions;
- wherein when a current flows to the driving assembly, directions of the current in the first segment portions are opposite.

19. The optical element driving mechanism as claimed in claim 1, wherein the driving assembly further includes:
- a plurality of driving magnetic elements; and
- a driving coil, corresponding to the driving magnetic elements, wherein the driving coil has a first segment portion and a second segment portion, the second segment portion is perpendicular to the first direction, magnetic poles of the driving magnetic elements are arranged in the same direction, and the first segment portion is disposed between the driving magnetic elements;
- wherein the driving magnetic elements are arranged along the second direction, and when viewed in the second direction, the driving magnetic elements partially overlap the first segment portion.

20. The optical element driving mechanism as claimed in claim 1, wherein the driving assembly further includes:
- a driving coil, disposed on the movable assembly;
- a first driving magnetic element, corresponding to the driving coil and disposed on the fixed assembly;
- a second driving magnetic element, corresponding to the driving coil and disposed on the fixed assembly, wherein the driving coil is disposed between the first driving magnetic element and the second driving magnetic element, and the first driving magnetic element and the second driving magnetic element are arranged along a second direction; and
- a magnetically conductive element, corresponding to the first driving magnetic element, and when viewed in the first direction, the magnetically conductive element is located between the first driving magnetic element and the driving coil.

21. The optical element driving mechanism as claimed in claim 20, wherein a shortest distance between the first driving magnetic element and the driving coil is greater than a shortest distance between the second driving magnetic element and the driving coil.

22. An optical element driving mechanism, comprising:
- a fixed assembly;
- a movable assembly, corresponding to an optical element, and the movable assembly being movable relative to the fixed assembly;
- a driving assembly, configured to drive the movable assembly to move relative to the fixed assembly; and
- a position-sensing assembly, configured to sense movement of the movable assembly relative to the fixed assembly, the position-sensing assembly comprising:
  - a sensed unit; and
  - a sensing element, corresponding to the sensed unit, wherein the sensed unit has a plurality of reference magnetic elements arranged in a first direction, the sensed unit and the sensing element are arranged in an arrangement direction, and the first direction is not parallel to the arrangement direction;

wherein the driving assembly is configured to drive the movable assembly to move relative to the fixed assembly in the first direction within a range of movement and in the first direction, a center distance between the reference magnetic elements is greater than the range of movement.

23. An optical element driving mechanism, comprising:
a fixed assembly;
a movable assembly, corresponding to an optical element, and the movable assembly being movable relative to the fixed assembly;
a driving assembly, configured to drive the movable assembly to move relative to the fixed assembly; and
a position-sensing assembly, configured to sense movement of the movable assembly relative to the fixed assembly, the position-sensing assembly comprising:
a sensed unit; and
a sensing element, corresponding to the sensed unit, wherein the sensed unit has a plurality of reference magnetic elements arranged in a first direction, the sensed unit and the sensing element are arranged in an arrangement direction, and the first direction is not parallel to the arrangement direction;
wherein a spacer element is disposed between the reference magnetic elements, and when viewed in the first direction, the reference magnetic elements partially overlap the spacer element, and the spacer element has a non-magnetic permeability material.

24. An optical element driving mechanism, comprising:
a fixed assembly;
a movable assembly, corresponding to an optical element, and the movable assembly being movable relative to the fixed assembly;
a driving assembly, configured to drive the movable assembly to move relative to the fixed assembly; and
a position-sensing assembly, configured to sense movement of the movable assembly relative to the fixed assembly, the position-sensing assembly comprising:
a sensed unit; and
a sensing element, corresponding to the sensed unit, wherein the sensed unit has a plurality of reference magnetic elements arranged in a first direction, the sensed unit and the sensing element are arranged in an arrangement direction, and the first direction is not parallel to the arrangement direction;
wherein the driving assembly further includes a driving magnetic element and a driving coil, the optical element driving mechanism further includes a magnetically conductive fixing member, the driving magnetic element is disposed between the magnetically conductive fixing member and the driving coil, and the magnetically conductive fixing member is configured to fix the driving magnetic element.

* * * * *